(12) United States Patent
Silich (10) Patent No.: US 8,152,109 B2
(45) Date of Patent: Apr. 10, 2012

(54) METHOD AND SYSTEM FOR CONTROLLING FLUID FLOW IN RELATION TO A FOIL AND HARNESSING ENERGY THEREFROM

(76) Inventor: Bert A. Silich, Harrison Township, MI (US)

(*) Notice: Subject to any disclaimer, the term of this patent is extended or adjusted under 35 U.S.C. 154(b) by 502 days.

(21) Appl. No.: 11/947,063

(22) Filed: Nov. 29, 2007

(65) Prior Publication Data

US 2010/0044501 A1 Feb. 25, 2010

(51) Int. Cl.
*B64C 21/04* (2006.01)
*B64C 21/06* (2006.01)
*B64C 5/08* (2006.01)

(52) U.S. Cl. .............. 244/208; 244/200.1; 244/199.4

(58) Field of Classification Search .............. 244/198, 244/204, 207, 208, 209, 210, 200.1, 201, 244/204.1, 199.1, 87, 12.5, 23 D
See application file for complete search history.

(56) References Cited

U.S. PATENT DOCUMENTS

| | | | | |
|---|---|---|---|---|
| 2,019,018 A | * | 10/1935 | Methvin | 244/204 |
| 2,108,652 A | | 2/1938 | Coanda | |
| 3,090,584 A | * | 5/1963 | Kuchemann et al. | 244/199.1 |
| 3,173,628 A | * | 3/1965 | Marchant et al. | 244/12.5 |
| 3,261,576 A | * | 7/1966 | Valyi | 244/130 |
| 3,262,658 A | * | 7/1966 | Reilly | 244/207 |
| 3,586,267 A | * | 6/1971 | Ingelman-Sundberg | 244/203 |
| 3,920,203 A | * | 11/1975 | Moorehead | 244/207 |
| 3,936,017 A | * | 2/1976 | Blythe et al. | 244/110 B |
| 7,100,875 B2 | * | 9/2006 | Shmilovich et al. | 244/199.4 |
| 7,143,983 B2 | * | 12/2006 | McClure | 244/204 |
| 2004/0089764 A1 | * | 5/2004 | McClure | 244/52 |

* cited by examiner

*Primary Examiner* — Timothy D Collins
*Assistant Examiner* — Joseph W Sanderson
(74) *Attorney, Agent, or Firm* — Brooks Kushman P.C.

(57) ABSTRACT

A method and system 10 for controlling fluid flow 12 in relation to a body or foil 14. The system 10 has one or more channels 16, at least some of which having an inlet port 18 and an outlet port 20 defined in the foil 14 through which at least some of the fluid 12 may flow. The inlet port 18 is defined adjacent to a leading edge region 22 of the foil 14 and the outlet port 20 is located in a another region 24 of the foil. Optionally, a differential vectoring means 24 provides a differential mass flow rate across the foil 14 to provide a resultant force that in one illustrative environment creates, enhances, or stops a rolling action of the foil 14.

7 Claims, 7 Drawing Sheets

FIG. 3A
(positive roll movement)

FIG. 3B
(negative roll movement)

FIG. 3C
(positive lift force)

FIG. 3D
(negative lift force)

METHOD AND SYSTEM FOR CONTROLLING FLUID FLOW IN RELATION TO A FOIL AND HARNESSING ENERGY THEREFROM

BACKGROUND OF THE INVENTION

1. Field of the Invention

The invention relates to a method and system for controlling gaseous or liquid flow in relation to a body that is interposed in the flow path.

2. Background Art

One example of fluid flow in relation to a foil is an air foil (e.g., aileron, flap, rudder, elevator) associated with an aircraft that is interposed in a flow path defined by ambient air. As used herein, the term "fluid" includes gaseous (e.g., air) and liquid matter (e.g. water). In the context of aerodynamics, the background of this invention includes air foils that may be provided on aircraft, automobiles—including race cars—and, in the context of hydrodynamics, hydrofoils that are provided on some boats or amphibious vehicles for influencing their passage through water or air.

The low speeds that small aircraft operate at, especially during take-off, initial climb, and approach to landing, make stall a significant safety concern. When an aircraft enters a stall, it typically rolls. If not corrected, this can lead to an uncontrollable spin. Due to the flow separation of air from a wing at stall, the aileron and rudder controls may be unable to return the aircraft to a level configuration. This situation accounts for the majority of general aviation (GA) accidents.

In either the aerodynamic or hydrodynamic context, the efficiency of fluid flow around an object—sometimes referred to herein as a "foil"—is impeded when there is flow separation between the fluid and the foil. This may occur adjacent areas of an abrupt change in the profile that a foil presents to incident fluid. In such circumstances, it may be desirable to harness energy associated with the incident fluid flow.

It is known that low speed maneuverability is desirable in aircraft, ships and submarines. As noted above, the forces associated with conventional hinged control surfaces ("control authority") may not be enough to allow certain maneuvers to be performed.

SUMMARY OF THE INVENTION

In one aspect, the invention relates to the use of air foils with circulation control mechanisms that produce a desired control authority at low speeds by providing vectored thrust.

In one facet of the invention, an aircraft roll control system—referred to herein as a Roll Stability System "RSS"—has been developed. It is to be appreciated however, that this invention is not limited to the aircraft industry. In addition to roll control at stall, this multi-functional system can be used to augment or replace ailerons during cruise flight in order to bank and turn an aircraft. Accordingly, the RSS has the potential to enhance aircraft safety and control in wide regimes of flight.

In one embodiment, the RSS includes ducts that permit airflow through a number—e.g. three—of inlets that are provided at or near the leading edge of a foil, such as an airfoil wing and channel it to one or more outlets at or near a downstream location of the foil, such as a wingtip. In one aspect of the invention, this airflow is differentially vectored in the desired direction (up or down) to provide a roll moment.

One embodiment of the system produces in an aerodynamic environment a sufficient roll moment for enhanced control during stall.

BRIEF DESCRIPTION OF THE DRAWINGS

FIG. 3 (a-d) illustrates an aircraft's response to differential thrust vectoring situations;

FIG. 13 illustrates an embodiment of the invention when used in an automobile environment (a) with the system activated; and (b) with the system deactivated.

DETAILED DESCRIPTION OF THE PREFERRED EMBODIMENT(S)

In one aspect of the invention, an aircraft roll control system 10, sometimes termed herein as a Roll Stability System ("RSS") is provided that can be used in various flight regimes. When appropriately deployed, the RSS minimizes roll during a stall. The system in one embodiment (FIG. 1) uses a flow control means for controlling ambient fluid flow that siphons airflow from the leading edge 22 of the wing 14 and channels it to winglet ports at the wingtip region 40 (FIGS. 2, 3a, b), where it is vectored differentially (upwardly/downwardly) to provide a force that will counteract the turning or roll moment caused by stall.

Also, the RSS is effective in cruise conditions by influencing the aerodynamic efficiency of the wing in a manner discussed below.

In one configuration (FIG. 1), a flow vectoring system 10 includes three inlet ports 18 on the underside of the wing 14 proximate the leading edge 22 that are in fluid communication with a single outlet port 20 proximate the wingtip 40, where the flow is then vectored in one embodiment through a t-connector 30 (FIG. 2) either up, down, or spanwise. They are not restricted to these directions, and could be forward or aft or any angle in between. In one example, the flow was routed through the wing via 0.5 in. copper tubing. Alternatively, flow could be routed through a tubular wing spar.

Accordingly, one aspect of the invention includes a system 10 for controlling fluid flow 12 in relation to a foil or body 14. The system 10 has one or more channels 16, at least some of which include one or more inlet ports 18 and one or more outlet ports 20 defined in the foil 14 through which at least some of the fluid 12 may flow. At least one inlet port 18 is defined adjacent to a leading edge region 22 of the foil 14 and at least one the outlet ports 20 is located for example—but not necessarily—in a downstream or trailing region 24 of the foil 14.

An optional differential vectoring means 26 (e.g., FIG. 2) provides a differential mass flow rate at the lateral aspect of the foil 14 to create a moment or force couple that counteracts or enhances a roll moment exerted upon the foil 14 by an inequality of pressure above and below the foil 14.

Figure 1:
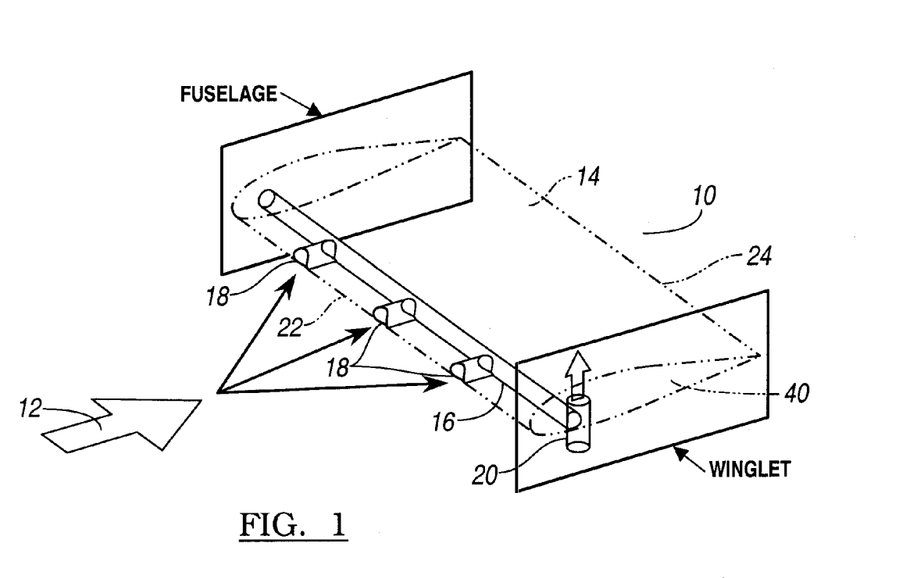
FIG. 1 is an illustrative embodiment of a system for controlling fluid flow in relation to a body or foil.

Preferably, the one or more channels 16 comprise one channel with three inlet ports 18 and one outlet port 20 (FIG. 1). In one embodiment, at least some of the three inlet ports 18 are located adjacent the leading edge region 22 of the foil 14.

In general, a "channel" as used herein connotes a structure—e.g. a tube—that allows an external environmental condition—for example, temperature, static and dynamic pressure and mass flow rate—to travel through the foil or body 14.

It will be appreciated that the inlet holes 18 can be of various shapes and sizes that have an aperture that can be relocated laterally or longitudinally and changed in real time such that the aperture that can be adjusted from 0% to 100% open. Similarly, for the outlet ports 20 and channels 16.

It will be appreciated that a given orifice may serve as an inlet port 18 in certain conditions and an outlet port 20 under other conditions.

As used herein, the term "fluid" is construed as that which emanates from a passive or active fluid source that can be used to create a mass flow rate. "Passive" includes the notion of using energy from air surrounding a fluid flow field—e.g., when a wing travels through air. "Active" connotes the situation in which fluid is supplied by an energy active flow field—e.g., compressed air from a tank (high pressure), a ram air inlet on a car or airplane and bleed air emanating from an engine. It will be appreciated that an active fluid source could also be a low energy field, such as a vacuum.

The foil 14 may be embodied as a wing, an elevator, a flap, a rudder, a propeller, a wind generator and a speed brake. More generally, the term "foil" includes a body in general and includes any structure that is surrounded by fluid flow. Other examples include an automobile, a bicycle, a dragster, a race car, or a spoiler on a vehicle.

The fluid may be air, water, a coolant, oil and an inert gas. In general, a "fluid" as used herein is a form of matter that is unable to sustain sheer stress. It may be compressible or noncompressible.

In one aspect of the invention, the differential vectoring means 26 (FIG. 2) includes a control module 28 in communication with a valve mechanism 30 positioned upstream of the outlet ports 20. The control module 28 may have a sensor input 32 that generates a sensing signal ($S_1$) indicative of a flow state. One example of the flow state sensed by the sensing signal ($S_1$) is an incipient stall condition. The control module 28 processes the sensing signal ($S_1$) and communicates an activation signal ($S_2$) to the valve mechanism 30 that has a gating system 34 for influencing fluid flow to the outlet ports 20.

Figure 2:
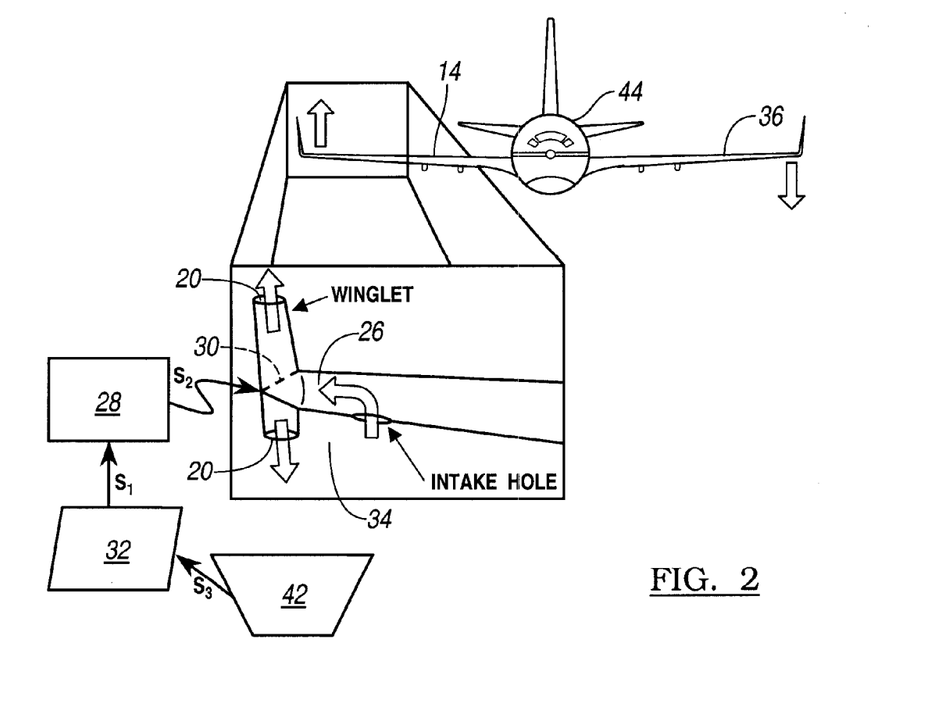
FIG. 2 shows one embodiment of the invention that includes a system that diverts air out from winglets to impart a roll moment.
Figure 3A:
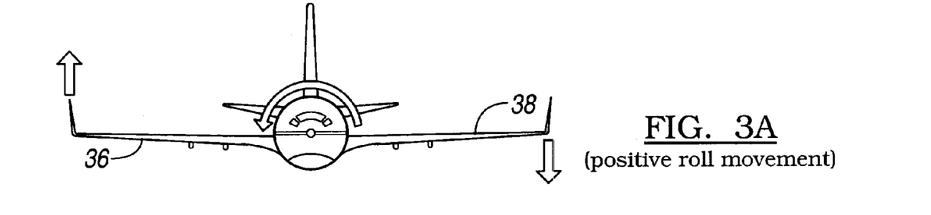
Figure 3B:
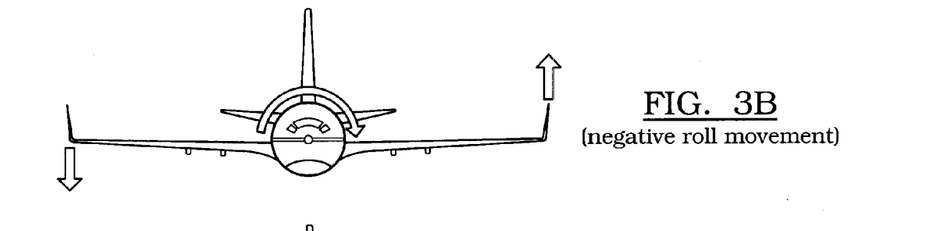
Figure 3C:
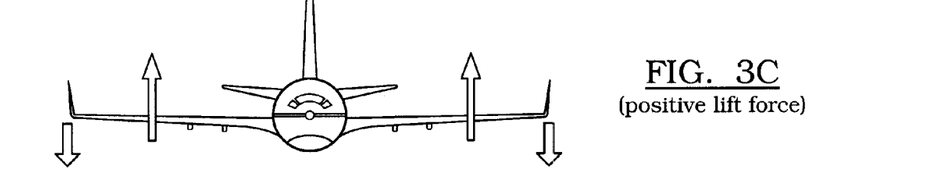

In one embodiment, to inhibit an aircraft roll, the activation signal ($S_2$) moves the gating system 34 so that more fluid is directed to an outlet 20 located beneath a wing tip or a trailing edge 24 of a descending portion 36 of the foil (FIG. 3a). Optionally or additionally, the activation signal ($S_2$) may move the gating system 34 so that more fluid is directed to an outlet 20 located above a wing tip or trailing edge 24 of an ascending portion 38 of the foil. If desired, the system could be reconfigured so that inappropriate circumstances, the gating system 34 may influence mass flow rate in such a way that a roll maneuver is facilitated. To enhance a roll, the logic of the gating system 34 is merely reversed. Preferably, the gating system 34 includes a valve 30 (FIG. 2) associated with at least some of the outlet ports 20. If desired, a control line (either electronic or hydraulic) to deliver the signal ($S_2$) can be hardwired or wirelessly communicated or communicated hydraulically or pneumatically through a pressure line between the yoke and a valve associated with the gating system (FIG. 2).

Optionally, as illustrated in FIG. 2, the control module 28 is in communication with a valve mechanism 30 positioned upstream of the outlet ports. The control module 28 has a sensor input 32 that receives a signal ($S_3$) from an operator 42 of a vehicle 44 with which the foil 14 is associated. In some cases, the operator 42 may be situated on board the vehicle 44. In others, the operator 42 may be situated remotely from the vehicle 44. It will be understood that the operator 42 may be a human being or a robot.

Optionally, the outlet port 20 may be located adjacent to a wingtip region 40 of the foil 14 (FIGS. 1, 2).

In broad terms, the flow control means actively moves a flow condition from an inlet 18 to an outlet port 20. Actively moving a flow condition from one point to another can change the way the flow travels over the geometry of the body 14. This aspect of the invention therefore is influenced by the size and placement of inlet 18 and outlet 20 ports in relation to the outer contours of the body 14.

Figure 4:
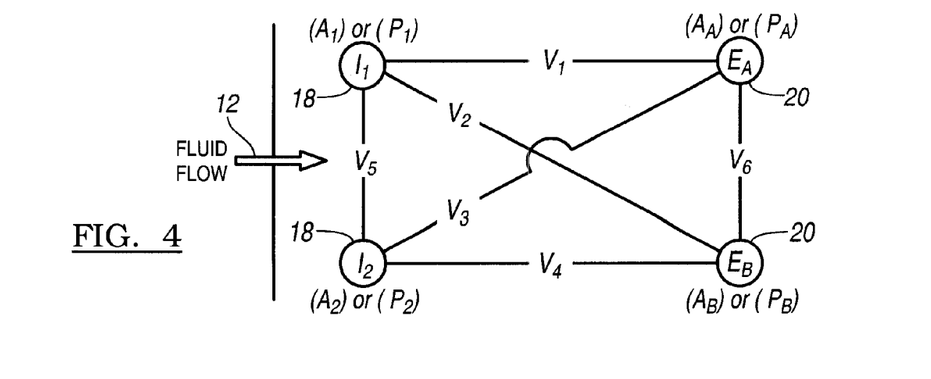
FIG. 4 depicts nomenclature and a system in configuration in which there are four holes for illustrative purposes only.

Turning now to FIG. 4, there is now depicted one embodiment of the invention in which four holes are deployed for illustrative purposes only. There are two inlets ($I_1$, $I_2$) and two outlets ($E_A$, $E_B$). The source of fluid can either be passive (P) or active (A). The valves ($V_n$) allow uni-directional or bi-directional flow. The valves are accommodated in a chamber—e.g., tubing—that allows fluid flow.

In the embodiment of FIG. 4, valve ($V_1$) is interposed between an inlet ($I_1$) and an exit ($E_A$). Valve ($V_2$) is interposed between inlet ($I_1$) and an exit ($E_B$); valve ($V_3$) lies between inlet ($I_2$) and exit ($E_A$); valve ($V_4$) lies between inlet ($I_2$) and exit ($E_B$); valve ($V_5$) is interposed between inlet ($I_1$) and inlet ($I_2$), while valve ($V_6$) lies between exit ($E_A$) and exit ($E_B$). Active or passive fluid flow enters the system at $I_1$ ($A_1$ or $P_1$). Active or passive fluid flow ($A_2$ or $P_2$) enters the system at Inlet ($I_2$).

Correspondingly, active or passive fluid flow ($A_A$ or $P_A$) emerges from the system at exit ($E_A$). Active or passive fluid flow ($A_B$ or $P_B$) emerges from the system at exit ($E_B$).

Assume the diameter of the inlets is the same ($I_1=I_2$) and there is no active flow ($A_1=A_2=0$). Further assume that the passive flows entering each inlet are the same ($P_1=P_2$).

For simplicity, also assume that the diameter of the outlets is the same ($E_A=E_B$) and that there is no active fluid flow that emerges ($A_A=A_B=0$) and that passive fluid flows emerging are also equal ($P_A=P_B$). Further assume a symmetric flow field in which the condition of interest (e.g. pressure, temperature, mass flow rate) is known at the inlets. The values sought are the exit values for various combinations of open or closed valves $V_1$-$V_6$.

A Design of Experiments (DOE) technique can be applied to obtain the full factorial designs for the six variables ($V_1$-$V_6$) above. There are $2^6$ combinations in a two-level design. It will be appreciated that as the system becomes more involved with more holes and valves, the technique of DOE allows a reduction of the full-factorial set to a manageable number while still allowing a possible solution.

Figure 5:
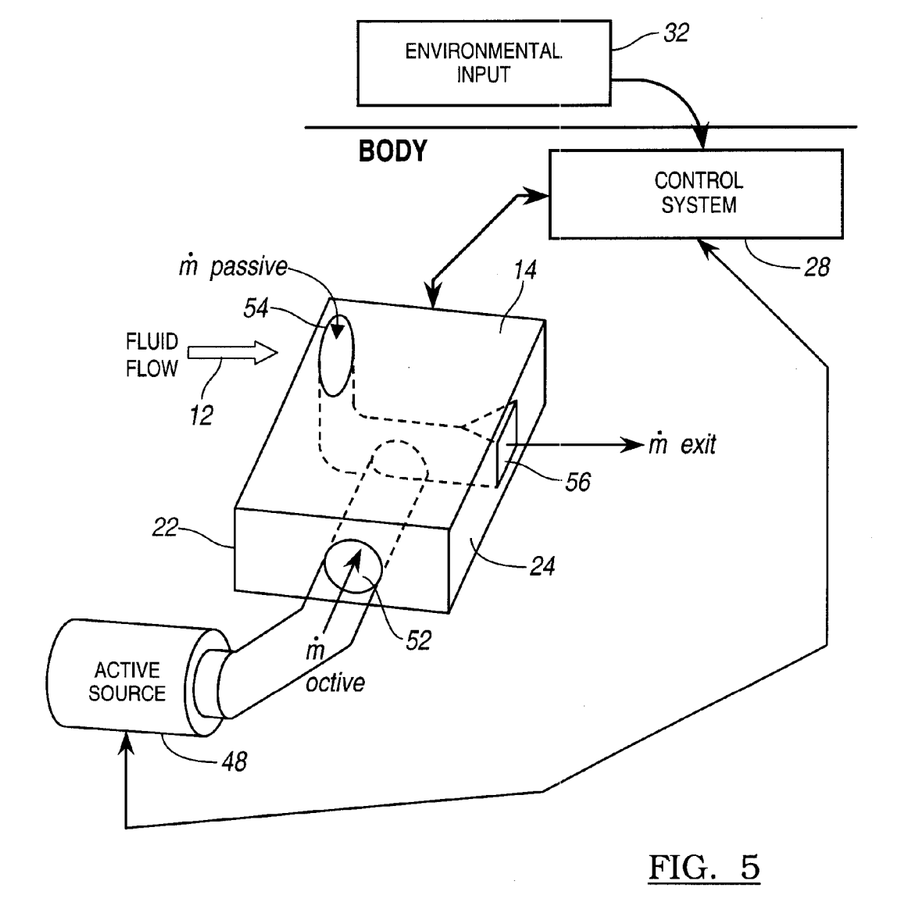
FIG. 5 illustrates a basic system design according to the invention that uses pressure as a possible parameter to derive other parameters of interest, such as mass flow rate ($\dot{m}$) to develop a force on the body.

FIG. 5 depicts one aspect of the system in which pressure is used as a parameter by which to derive other parameters of interest, such as ṁ(mass flow rate). FIG. 5 illustrates a body 14 that has an active source 48 of fluid flow that delivers fluid to an inlet 52. Another inlet 54 receives a passive fluid flow. The flows converge and exit at outlet 56.

The control system effectively influences the configuration of holes, valves, and the amount of fluid flow delivered by the active source 48 of fluid. An environmental input 32 is in communication with the control system 28.

Taking FIGS. 4 and 5 together, it will be appreciated that holes or ports in the body or foil can change the characteristics of the surrounding flow. Holes alone—i.e. without a gating system 24—can connect or mix one set of environmental condition (dynamic or static pressure), temperature, flow velocity, mass flow rate (ṁ) with characteristics associated with other hole locations.

Figure 6:
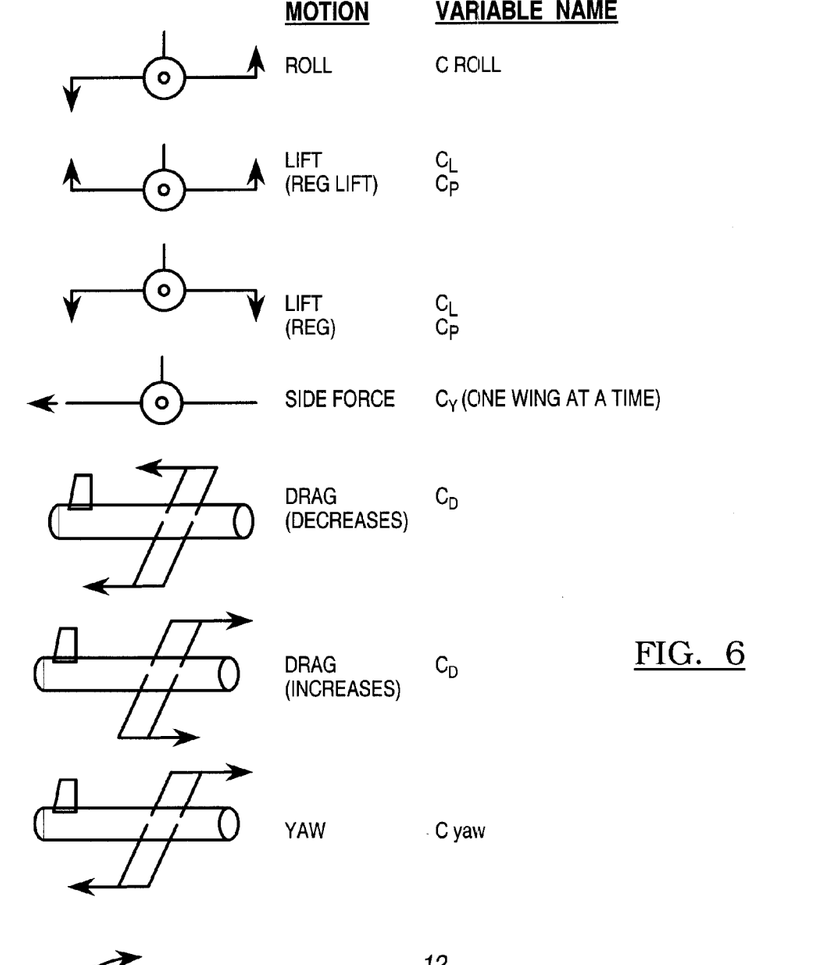
FIG. 6 illustrates ways in which vectored thrust may affect certain parameters that characterize various attitudes in an aircraft.

The body's performance characteristics can be measured by such parameters as, but not limited to lift, drag, side force, roll, pitch, and yaw, or six aerodynamic coefficients—$C_L$, $C_D$, $C_Y$, $C_R$, $C_P$, and $C_{YAW}$ (FIG. 6). For example, the lift coefficient ($C_L$) is a dimensionless parameter that is directly proportional to the lift force. Likewise, the coefficient of drag ($C_D$) is a dimensionless parameter that is directly proportional to the amount of drag in a given configuration. Thus, the lift-to-drag ratio is a measure of the overall performance of an aircraft. This dimensionless parameter indicates, at any flight condition, how much lift is being generated in comparison to how much drag is being generated. Generally, a high ratio is desired because more lift than drag is being generated and the aircraft will be more efficient. The effect of the holes and passive or active inputs is to control the changes in a body's performance coefficients. This gives the ability to control the body's performance characteristics and leads to an increase or decrease in these parameters for such purposes as improved control, performance, maneuverability, safety and efficiency.

Thus, the disclosed system of holes and flow can replace or augment externally moving control surfaces which traditionally change a body's performance coefficient—e.g. ailerons, elevators, rudders, etc.

One aspect of the invention addresses a desire to change aircraft configuration in different phases of flight. For example, in a stealth environment, it would be desirable to maneuver a stealth aircraft without any noticeable change in its external profile in order to avoid radar detection. In such an environment, it would be desirable, for example, to start or stop a roll maneuver of the aircraft and thus change its heading without any perceptible change in rudder or aileron deflection. Such a need can now be satisfied by the present invention. Other than in the cruise regime, a desired output can also be used to influence the characteristics of stall, take off, and landing by suitable adjustments in at least some of the parameters listed above.

Other aspects of the invention include the ability to open and close different holes to match the maximum static pressure in a region around a body's stagnation point. As used herein, the term "stagnation point" refers to a region at which there is a separation of flow between the fluid that passes over an upper surface and a lower surface, or at a left- and a right-side of a body.

As noted earlier, one example of an active pressure source is represented by RAM air configurations. RAM air pressure can be associated with several advantageous locations—such as an aircraft's nose inlet, the front end of a car or train, the leading edge of a wing, its under surface, an external compressor tank (as suggested in FIG. 5), an engine compressor, and bleed air that emerges from a jet engine.

If desired, vacuum systems can also be applied to a port to create a desired condition. Such systems include an active source or a passive source, like a venturi tube.

Figure 8:
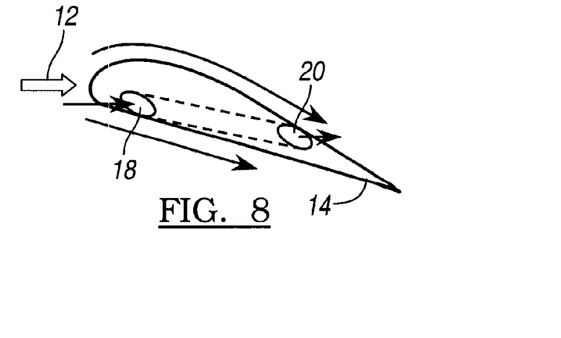
FIG. 8 illustrates a configuration in which an exit port can reduce drag by being located near an area of turbulent flow in order to maintain a laminar flow.

Within the scope of the invention also lies exit holes 20 that can be placed strategically for specific advantages. If desired, an exit port 20 can be situated so as to introduce flow to an area of turbulent flow, thereby maintaining or extending an area of laminar flow and also reducing drag (FIG. 8). Advantageously, the exit hole 20 could be located in an area of an aircraft wing 14 in which a stall condition exists. Another example is illustrated by an exit hole that is located behind an area of a car or truck or boat in order to reduce drag.

Turning now to FIG. 3, there are illustrated in drawings (a-d) various configurations of an aircraft in flight. When a large mass flow rate (ṁ) is channeled suitably, vectored thrust can be produced which can be usefully harnessed, for example at a wing tip to create a turning moment (FIGS. 3a, b). The vectored thrust condition can occur not only in a stall but at any phase of flight with appropriate positioning and aperture settings of the inlet 18 and outlet 20 ports.

If desired, various outlet ports 20 can be opened, thereby increasing drag and replacing or augmenting aircraft drag devices, such as spoilers, boards and thus increasing $C_D$.

Figure 7:
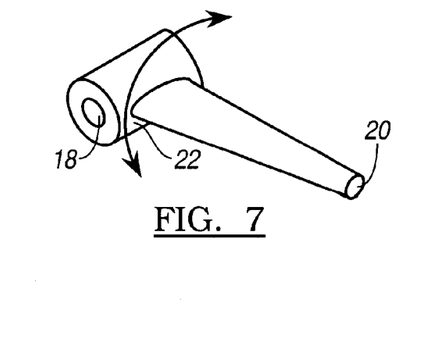
FIG. 7 illustrates a configuration in which a leading edge of a wing can be rotated so as to reorient an outlet port at adjustable angles.

In FIG. 7, there is illustrated a configuration in which a leading edge 22 of a wing 14 is rotatable, thereby altering the orientation of one or more inlet ports 18 in relation to fluid flow, thereby influencing mass flow rate and altering the emergent vectored thrust, either in direction or size.

Optionally, inlet ports 18 can be located (FIG. 8) near a leading edge 18 of a wing 14. This effectively increases the existing air flow's camber and leads to an increase in the effective coefficient of lift ($C_L$) and delay the angle of attack at which a stall may begin. Optionally, the inlet 18 and exit ports 20 may be opened and closed in any combination that would be effective to produce the desired consequence of a fluid flow that surrounds the body 14. In one example (FIG. 8) the exit holes can reduce drag by being located near a turbulent flow area, thereby maintaining laminar flow.

Thus, vectored thrust can cause changes in various performance parameters. The amount and direction of the vectored thrust may be influenced by the size, orientation, and positioning of an inlet 18 and/or an outlet port 20 with which it communicates. For instance, opening a port in a certain location may have the effect of increasing drag (FIG. 8) or changing a pitching moment.

Figure 9:
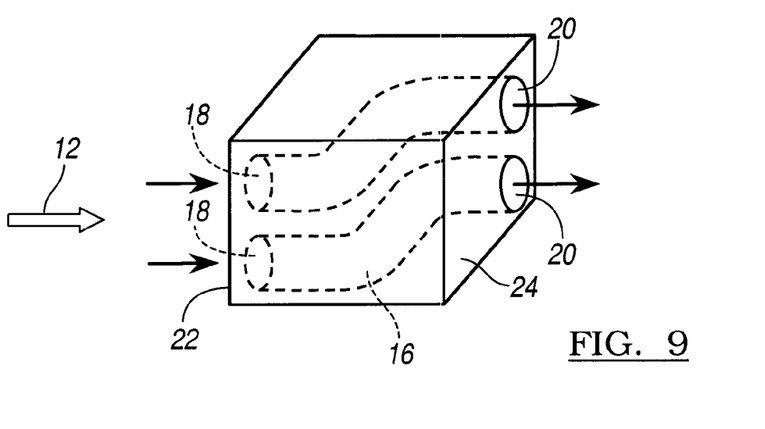
FIG. 9 depicts a block that is interposed in the flow of fluid with a pair of inlet ports that are offset from a corresponding pair of outlet ports such that the curved channel therebetween redirects fluid flow, exerts a force on the body due to mass flow rate, creates a turning moment and reduces drag.

In FIG. 9, a block 14 is illustrated that has a pair of inlet ports 18 that are located such that they are offset from corresponding outlet ports 20. A pair of channels 16 communicates between the respective inlet 18 and outlet ports 20. In the configurations shown, a turning moment is exerted upon the block by the incident and emergent fluid flow.

Figure 10:
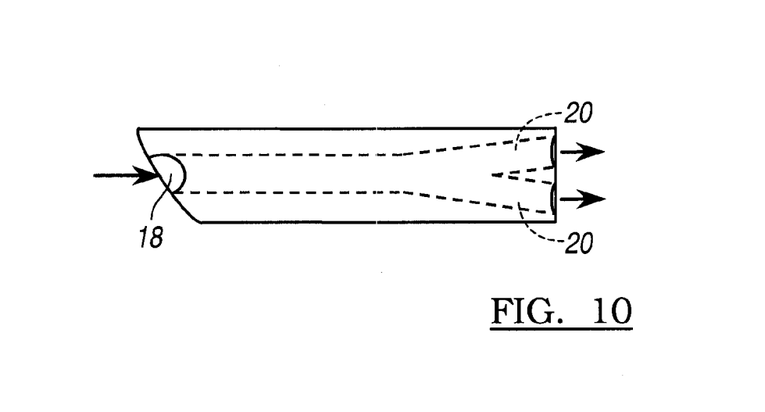
FIG. 10 illustrates a configuration in which there is a single inlet port and a pair of outlet ports that are located in order to reduce the drag from posterior turbulent flow.

In FIG. 10, there is a single inlet 18 and a pair of outlet ports 20 that have the effect of reducing drag caused by posterior turbulent flow. This configuration may have application at the rear end of a car or a truck in the area of the boot or trunk or at the rear of a boat, submarine or aircraft.

Figure 11:
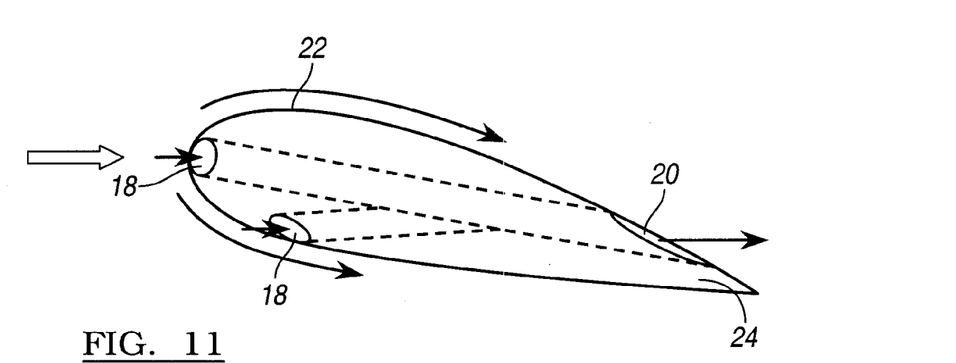
FIG. 11 illustrates a configuration in which there is a pair of inlet ports that communicate with a channel that leads to a single outlet port which reduces drag by reducing turbulence, increases the effective airfoil camber, reduces the stall angle of attack and increases the coefficient of lift.

In FIG. 11, there is suggested an aircraft wing that has a pair of inlet ports 18. One is located close to the leading edge 22 and another is located nearby, but on the underside of the wing 14. They communicate with a single channel 16 and exit port 20. In this configuration, drag is reduced by reducing turbulence around the exit port 20 and downstream thereof. This effectively increases the camber of the wing and reduces the stall angle of attack. It also increases the effect of camber and thereby increases the coefficient of lift ($C_L$). This configuration finds its application on an aircraft wing or on a racing car, for example.

In a preferred embodiment, either three or four inlet ports 18 are located at the leading edge within the first third of the wings' chord.

If desired, the diameter or aperture of the inlet 18 and outlet orifices 20 can be changed, if necessary using an iris-type configuration, similar to that found in cameras. Optionally, the location of the inlet port or ports 18 can be relocated or slid inwardly or outwardly, approximately parallel to the lateral axis of the aircraft.

Figure 13A:
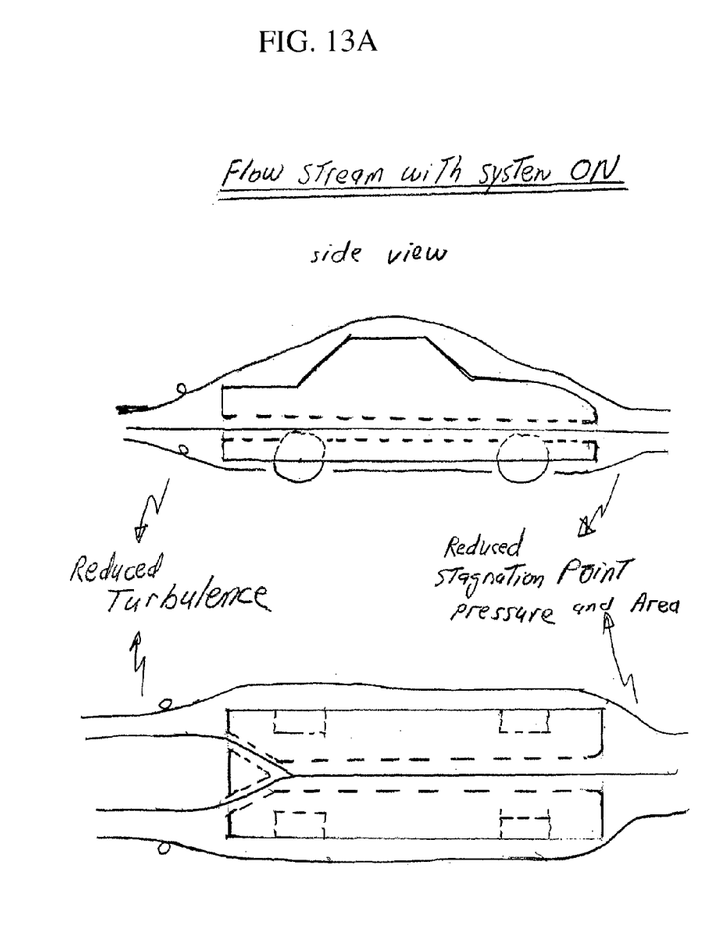
Figure 13B:
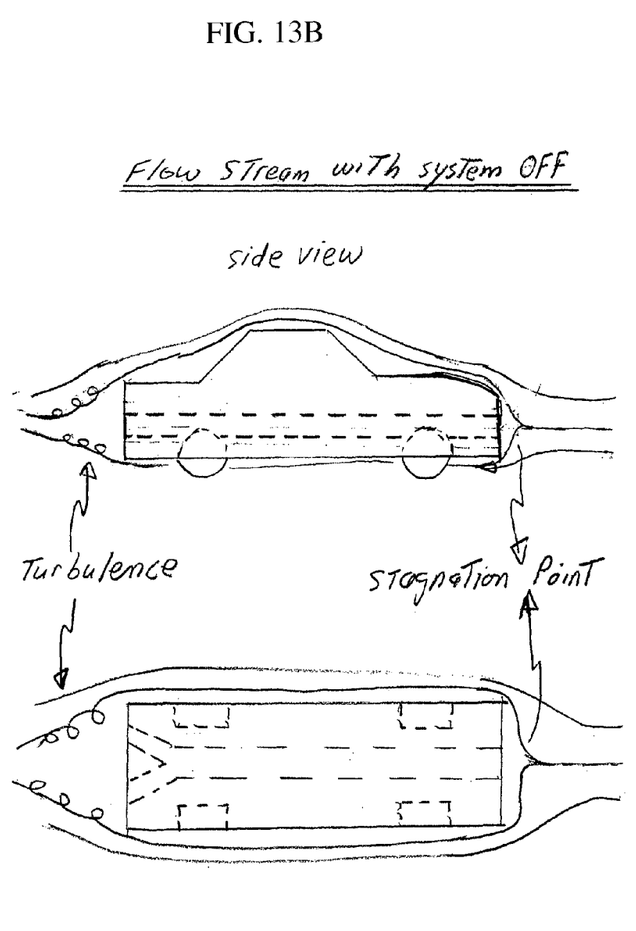

In a non-aviation environment, the system can be used on other vehicles and subassemblies—e.g., around tires—to reduce drag or through a car body for the same purpose. An illustrative embodiment in the automobile field is depicted in the side and top views of FIG. 13a-flow stream with the system on—and FIG. 13b—illustrating the flow stream with the system off. In FIG. 13a, there is a reduced stagnation point and pressure ahead of the vehicle and an area of reduced turbulence in its wake.

When the system is off (FIG. 13b), there is a normal amount of turbulence which has not been reduced since the system is inactive. Together, FIGS. 13a & b illustrate flow control and performance enhancement of a solid body—in this case an automobile—with a system of holes according to the invention.

Figure 12:
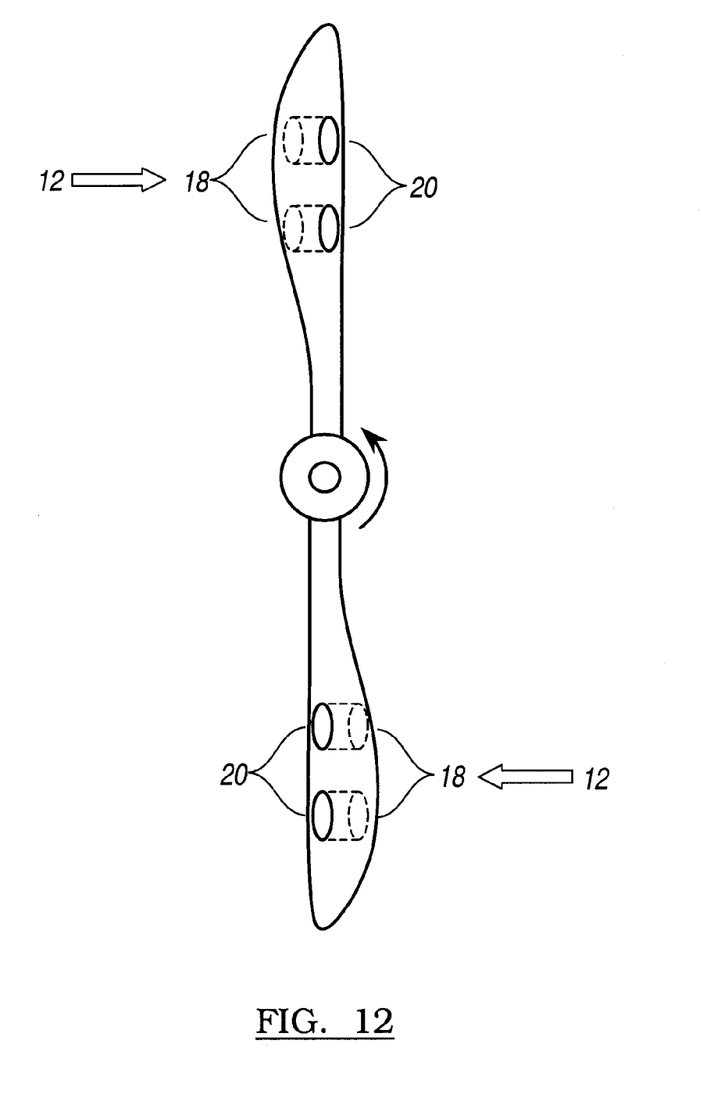
FIG. 12 schematically illustrates one embodiment of the invention wherein the foil is embodied in the blades of a propeller.

Another example of how the present system may be usefully deployed is illustrated in FIG. 12. The depicted propeller has two blades. In each blade, for example, there are two inlets 18 and two outlets 20, as suggested when the direction of rotation is counterclockwise. In some circumstances, the deployment of inlets and outlets can be provided without significant weakness to the propeller blades in order to increase the ratio of $C_L$ to $C_D$. It will also be appreciated that the disclosed propeller may have a different number of blades (e.g. 3,4, etc.) or be embodied in a wind generator. In this way, flow through a wing or propeller from the leading edge to the trailing edge may desirably maintain laminar flow longer than in the absence of channels that connect the inlets and associated outlets.

Experimental Observations

In order to test the RSS, a small-scale wing model with the system installed was placed in a wind tunnel with force, moment, and pressure data acquisition equipment.

Observations have been made that the RSS is capable of producing an angular acceleration of up to 3 degrees per second squared ($°/s^2$) in a Cessna 172 in stall conditions with a pipe diameter of 0.5 inches (in.)

Another aspect of the invention is the ability of the RSS to produce a sufficient roll moment for banking an aircraft in cruise conditions without adversely affecting aerodynamic efficiency. For example, a Cessna 172 was analyzed by testing a scaled-down wing model at zero degrees angle of attack and speeds of 80, 90 and 100 miles per hour (mph). Testing criteria required a minimum of $3°/s^2$ angular acceleration without reducing the lift-to-drag ratio by more than 10%. Based on the results, the RSS achieved a target angular acceleration of $3°/s^2$ accompanied by a maximum decrease in lift-to-drag ratio of 3.1%. Observers determined that a 74.5 foot-pounds (ft-lbf) roll moment was required by the system, which was met by using a pipe diameter of 3.8 in.

In order to determine if the RSS would be feasible for augmenting the roll control of a Cessna 172, a minimum angular acceleration requirement of $3°/s^2$ was sought. This effectively entailed a winglet thrust requirement, because this is what imparts the torque on an aircraft that causes it to roll. A constant $3°/s^2$ roll acceleration would roll the aircraft by 37.5° in five seconds, enough to sustain a 700 ft radius turn at an 10°/s turn rate. This was deemed sufficient for typical turning maneuvers executed by a Cessna 172.

The observers considered what criteria were relevant to assessing the suitability of the RSS for a Cessna 172 in cruise flight regime. They felt that adequate turning performance by the RSS should not significantly reduce aerodynamic efficiency of the aircraft. They deemed a greater than 10% reduction in average lift-to-drag ratio unacceptable for maintaining the original Cessna 172's range because it would reduce the range of the aircraft by 10%, or about 60 miles.

Upon completion of the wind tunnel tests, observers determined both force and moment data on the wing body and mass flow rate data of the system. They found that the most mass flow through the system was obtained with all inlets open, as expected. These data were used to characterize the overall efficiency of the RSS and its effects on the aerodynamic performance of the wing.

There are some aerodynamic losses when the RSS was engaged. Unless avoided or corrected, these can cause an aircraft to pitch down and descend unless a trim and power input is made to maintain airspeed and altitude.

Figure 3D:
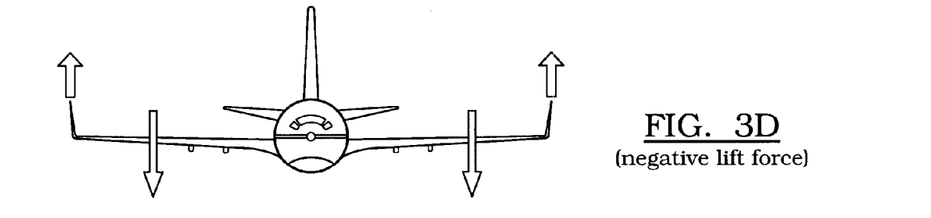

FIG. 3(d), for example, shows a regime in which the up vectoring (small arrows) decreases lift (large arrows), because upward thrust effectively creates a net downward force. That deviation drops with increasing speed, likely because the wing's lift increases more quickly with speed than thrust from a wingtip outlet.

In one series of experiments, a flow vectoring system was studied that included six inlet ports on the underside of a wing, leading to a single exit port at the winglet, or outermost portion of the wing. The flow vectoring system included 0.5 inch copper tubing and served as part of the structural support for the wing. One of the goals of testing was to determine the optimal configuration of inlets and maximize the mass flow rate out of the exit port. Ten configurations of All Open, All Closed, and different combinations of open and closed inlets. Each configuration was tested at velocities of 30, 35, and 40 meters per second at angles of attack of 14, 16, and 18 degrees.

The observers concluded that the "All Open" at the leading edge provided the most optimal configurations. Further, the front row configuration occupied less space in the wing, thereby leaving more room for fuel storage.

The optimal "Front Row" configuration is capable of producing the required roll moment while producing small adverse effects on lift and drag. In one configuration, $C_L/C_D$ decreased by no more than the 10% desired by the experimenters. They observed that $C_L/C_D$ actually increased for the 16 degree and 18 degree angles of attack due to the increase in $C_L$. Without wishing to be bound by any particular theory, the inventor feels that this could be due to an effective increase in camber of the wing that occurs when the inlet holes are placed at the appropriate position on the underside of the leading edge. The applicant also theorizes that it was possible that by creating holes underneath the wing, some of the flow may have been directed partially up into the hole and then back out along the surface of the remainder of the wing and that this would effectively increase its camber, thus increasing lift.

List of Reference Numerals and Referenced Components/Features

10 System
12 Fluid
14 Foil
16 Channel
18 Inlet port
20 Outlet port
22 Leading edge
24 Trailing edge
26 Differential vectoring means
28 Control module
30 Valve mechanism
32 Sensor input
34 Gating system
36 Descending portion
38 Ascending portion
40 Wing tip region
42 Operator
44 Vehicle
46 Valve
48 Active source
50 Environmental input
52 Inlet (Active)
54 Inlet (Passive)
56 Exit (combined)

It will be appreciated that there are two phenomena that the disclosed system controls or develops. One creates a mass flow rate that develops a force that can move a body. Another is to move flow around the body in such a way as to control laminar and turbulent flow conditions which affect the forces acting on the body. Without wishing to be bound by any particular theory, it will be appreciated that these two phenomena are related in the sense that they both develop flows. But the primary purpose of the first flow is to develop a force and the primary use of the second flow is to control the flow.

Alternatively stated, the invention includes a system that can be configured to develop a mass flow rate vectored thrust which creates a force that can act on a body to change some or all of the six aerodynamic coefficients in many ways. A linear force can change lift or drag. A coupled force can create a moment, for example that may influence roll, pitch or yaw. The system can also be configured to control the flow so that the laminar flow is maintained or turbulent flow is reduced around a body in such a way that at least some of the six coefficients are changed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling fluid flow in relation to a body, comprising:
  a flow control means for controlling flow with one or more channels that have one or more inlet ports and one or more stationary outlet ports defined at least partially in the body through which at least some of the fluid may flow, the one or more inlet ports being defined adjacent to a leading region of the body and the one or more outlet ports being located in another region of the body; and
  a differential vectoring means for providing a mass flow rate through and across the body to provide a resultant force that creates a turning moment upon the body, the turning moment being able to be used to create, inhibit or enhance the body's roll, pitch or yaw behavior;
  wherein the differential vectoring means includes a control module in communication with a valve mechanism positioned upstream of the one or more outlet ports, the control module having a sensor input that communicates to the control module a sensing signal ($S_1$) indicative of a flow state, the control module processing the sensing signal ($S_1$) and communicating an activation signal ($S_2$) to the valve mechanism for influencing fluid flow to at least one of the one or more outlet ports.

2. The system of claim 1, wherein the flow state sensed by the sensing signal ($S_1$) is an incipient stall condition.

3. The system of claim 2, wherein the activation signal ($S_2$) moves the valve mechanism so that more fluid is directed to an outlet located beneath a trailing edge of a descending foil.

4. The system of claim 3, wherein the activation signal ($S_2$) moves the valve mechanism so that more fluid is directed to an outlet located above an ascending foil.

5. The system of claim 1, wherein the valve mechanism includes one or more valves associated with at least some of the outlet ports.

6. The system of claim 1, wherein at least some of the one or more inlet and outlet ports are characterized by an aperture, the diameter of which can be changed by the signal ($S_2$) from the control module.

7. A system for controlling fluid flow in relation to a body, comprising:
  a flow control means for controlling flow with one or more channels that have one or more inlet ports and one or more stationary outlet ports defined at least partially in the body through which at least some of the fluid may flow, the one or more inlet ports being defined adjacent to a leading region of the body and the one or more outlet ports being located in another region of the body;
  a differential vectoring means for providing a mass flow rate through and across the body to provide a resultant force that creates a turning moment upon the body, the turning moment being able to be used to create, inhibit or enhance the body's roll, pitch or yaw behavior;
  wherein the differential vectoring means includes a control module in communication with a valve mechanism positioned upstream of the one or more outlet ports, the control module having a sensor input that receives a signal ($S_3$) from an operator of a vehicle with which the foil is associated, the signal ($S_2$) from the control module being relayed to the valve mechanism.

* * * * *